United States Patent [19]

McSparran

[11] Patent Number: 5,153,475

[45] Date of Patent: * Oct. 6, 1992

[54] MAGNETIC AXIAL FORCE ACTUATOR CONSTRUCTION

[75] Inventor: Lloyd W. McSparran, Pittsburgh, Pa.

[73] Assignee: Contraves USA, Inc., Pittsburgh, Pa.

[*] Notice: The portion of the term of this patent subsequent to Jan. 8, 2008 has been disclaimed.

[21] Appl. No.: 638,732

[22] Filed: Jan. 8, 1991

[51] Int. Cl.⁵ .......................... H02K 1/12; H02K 7/09
[52] U.S. Cl. .................................. 310/254; 310/90.5; 310/216
[58] Field of Search ............... 310/254, 261, 217, 218, 310/214, 215, 216, 90.5

[56] References Cited

U.S. PATENT DOCUMENTS

| | | |
|---|---|---|
| 3,778,652 | 12/1973 | Endress ............................ 310/261 |
| 4,180,296 | 12/1979 | Habermann .................... 310/90.5 |
| 4,353,602 | 10/1982 | Habermann .................... 310/90.5 |
| 4,374,337 | 2/1983 | Kohzai et al. .................... 310/214 |
| 4,920,291 | 4/1990 | McSparran ..................... 310/90.5 |
| 4,983,870 | 9/1991 | McSparran ..................... 310/90.5 |

Primary Examiner—Steven L. Stephan
Assistant Examiner—E. H. To
Attorney, Agent, or Firm—Webb, Burden, Ziesenheim & Webb

[57] ABSTRACT

An electromagnetic actuator for producing axial forces between a stator element and a rotor element. The stator and rotor elements comprise structural bases with a laminated magnetic flux carrying assemblies secured therein. The laminated assemblies comprise a plurality of ferromagnetic sheets, each sheet extending substantially radially from and parallel to the axis of rotation. The rotor and stator elements are axially spaced with respective laminated assemblies in facing relationship.

21 Claims, 2 Drawing Sheets

MAGNETIC AXIAL FORCE ACTUATOR CONSTRUCTION

BACKGROUND OF THE INVENTION

In my U.S. Pat. No. 4,920,291 entitled "Magnetic Thrust Bearing with High Modulation Capability," I disclosed and claimed a unique construction enabling the placement of a magnetic flux carrying lamination in the stator of a magnetic thrust bearing. As is understood in the art, the purpose of the lamination is to minimize eddy currents caused by modulation of the magnetic flux. This application is directed to another unique construction for solving the same general problem; namely, construction of an axial magnetic force actuator having a flux carrying lamination in the rotor as well as the stator. As explained in U.S. Pat. No. 4,180,296, the rotor cannot be made of laminated material because the mechanical strength of the rotor would be too weak. In U.S. Pat. No. 4,353,602, a magnetic thrust bearing is disclosed in which the problem of eddy currents in the rotor is simply ignored. The invention disclosed herein is related to my invention disclosed in U.S. application Ser. No. 385,798, filed Jul. 26, 1989 entitled "Radial Magnetic Bearing."

It is known in the art to construct stators for magnetic thrust bearings with radially disposed E-shaped or U-shaped laminated assemblies consisting of a plurality of sheets (laminae). The sheets are stacked in milled radial slots. In this structure, the sheets themselves are not tapered since to do so would be impractical. This means that the milled slots must have parallel and nonradial side walls and limited circumferential length.

SUMMARY OF THE INVENTION

It is an object, according to this invention, to provide an axial thrust electromagnetic bearing, a magnetic axial force actuator, a stator construction and a rotor construction for an axial magnetic force actuator in which magnetic flux can be rapidly modulated without the generation of excessive eddy currents.

Briefly, according to this invention, an electromagnetic thrust bearing comprises a stator element, a rotor element, a sensor for sensing the axial distance between the stator element and the rotor element, a power supply for supplying electric current to the windings in the stator element and a control for adjusting the current provided by the power supply. The stator element is fixed relative to a base, for example, a machine, and the rotor element is journaled for rotation about an axis of rotation fixed relative to the stator element and/or for translation along the axis. The rotor and stator are axially spaced with their respective laminated assemblies in facing relationship.

The stator element comprises a structural base, a laminated magnetic flux carrying assembly of cutout, for example, E-shaped or U-shaped ferromagnetic sheets, and one or more magnetizing coils secured therein. Each sheet extends substantially radially from and parallel to the axis of rotation. The magnetizing coils lie in a groove provided by the cutout portions of the sheets. According to one embodiment, the structural base of the stator has a full circle cylindrical groove therein and the sheets are stacked into said groove. Preferably, the groove in the structural base of the stator has at least one cylindrical undercut recess therein and the sheets are stacked into said groove and recess.

A first group of E-shaped or U-shaped sheets has a radial length equal to about the radial width of the groove in the stator and at least one other group of partially E-shaped or U-shaped sheets has a shorter radial length and the sheets from different groups are interleaved with each sheet abutting the outer circumferential wall of the groove.

The rotor element comprises a structural base, for example, disk-shaped, fixed to an axle shaft or the like. A laminated magnetic flux carrying assembly is secured therein. The laminated assembly comprises a plurality of ferromagnetic sheets, each sheet extending substantially radially from and parallel to the axis of rotation. According to one embodiment, the structural base of the rotor has a full circle cylindrical groove therein and sheets are stacked into said groove. Preferably, the cylindrical groove in the base of the rotor has at least one cylindrical undercut recess therein and a plurality of sheets stacked into said groove and recess.

Preferably, the rotor lamination comprises a first group of I-shaped sheets having a radial length equal to about the radial width of the groove in the rotor and at least one other group of sheets having a shorter radial length. The sheets from different groups are interleaved with each sheet abutting the outer circumferential wall of the groove.

BRIEF DESCRIPTION OF THE DRAWINGS

Further features and other objects and advantages will become apparent from the following detailed description made with reference to the drawings in which.

DESCRIPTION OF THE PREFERRED EMBODIMENTS

Figure 1:
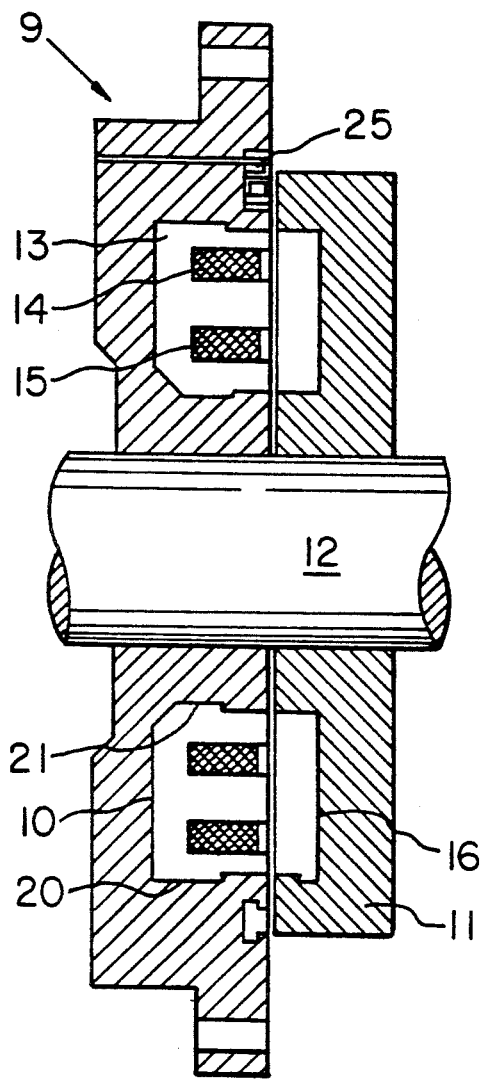
FIG. 1 is a section view of a magnetic thrust bearing according to this invention taken along a plane through the axis of rotation of the rotor.

Referring now to FIG. 1, a magnetic thrust bearing, according to this invention, comprises a stator 9 and a rotor 11 fixed to a shaft 12. The stator would typically be attached to the frame of a machine (not shown) in which the thrust bearing is located.

Figure 2:
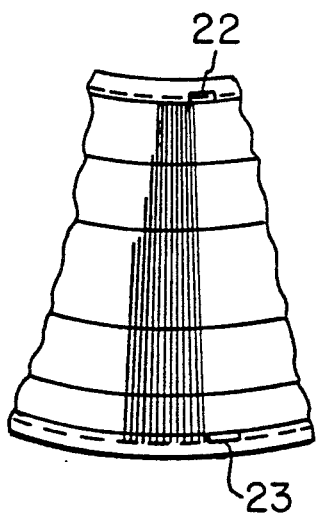
FIG. 2 is a view along the axis of rotation of a broken out portion of the stator of the bearing according to FIG. 1.

Referring to FIGS. 1 and 2, the thrust bearing stator 9 is comprised of a laminated flux carrying assembly 13. The stator has a circumferential groove 10 for holding the laminated assembly 13. Magnetizing coils 14, 15 are laid into circumferential slots in the laminated assembly. The slots are produced as a result of the E-shape of the individual sheets of the laminated assembly. The sheets in the laminated assembly are radially orientated. In other words, the faces of the sheets are parallel to the axis of rotation of the rotor and a radial line extending perpendicular to the axis of rotation. Typically, the sheets are stamped out of electrical steel such as silicon steel, iron cobalt alloys or the like. Preferably, the current flows in one direction around the shaft 12 in the coil 14 and in the other direction in the coil 15. However, in the case of the laminated assembly, the U-shaped sheets in the single coil permit current flow in only one direction around the shaft. In this case, the shaft should be nonmagnetic to avoid magnetization of the shaft.

Figure 4:
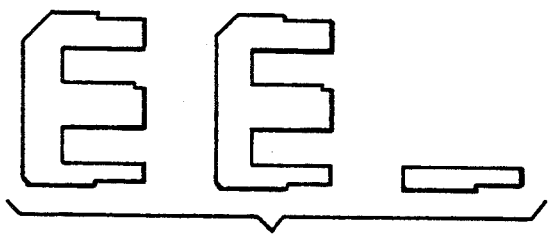
FIGS. 3 and 4 are views of the large faces of sheets in groupings as would be used in the stator shown in FIG. 2.
Figure 3:
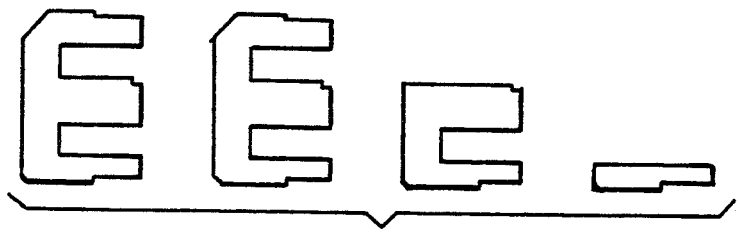

Because it is impractical to provide sheets of the laminated assembly with radial tapers and in order to maintain the desired radial orientation of the sheets, groupings of sheets having different radial lengths are used. Referring to FIGS. 3 and 4, two groupings are shown. These are stacked into the groove so that each sheet has an edge adjacent to the outer radial wall of the groove. The grouping of FIG. 3 is stacked into the circumferential groove six times for every time the grouping of FIG. 4 is used. Other groupings may be used, of course. Each grouping, when pressed together, approximates a tapered or pie-shaped cross section. In this way, the groove is substantially entirely filled with sheets for carrying the magnetic flux. The sheets are held in place, for example, by a nonconductive adhesive such as varnish or epoxy resin.

Referring to FIGS. 3 and 4, it can be seen that the inner and outer radial edges of the sheets (top and bottom in the drawings) are stepped. The groove 10 in the stator 9 has undercut recesses 20 and 21. Gaps 22 and 23 (see FIG. 2) are provided in the cylindrical flanges formed by the undercut recesses. In this way, the sheets can be inserted into the groove at the gaps and rotated into position. The stepped edges are thereby secured from axial movement by the interlocking of the sheets and the undercut recess. In an especially preferred embodiment, the undercut recess has a conical face on the circumferential flange at the outer radial edge of the groove. In other words, the recess has a double undercut. The step in the outer radial edges of the sheets are notched to engage the conical face of the recess when installed in the groove. In this way, the sheets are not only secured from axial movement but from radial movement by the cylindrical flange.

Figure 5:
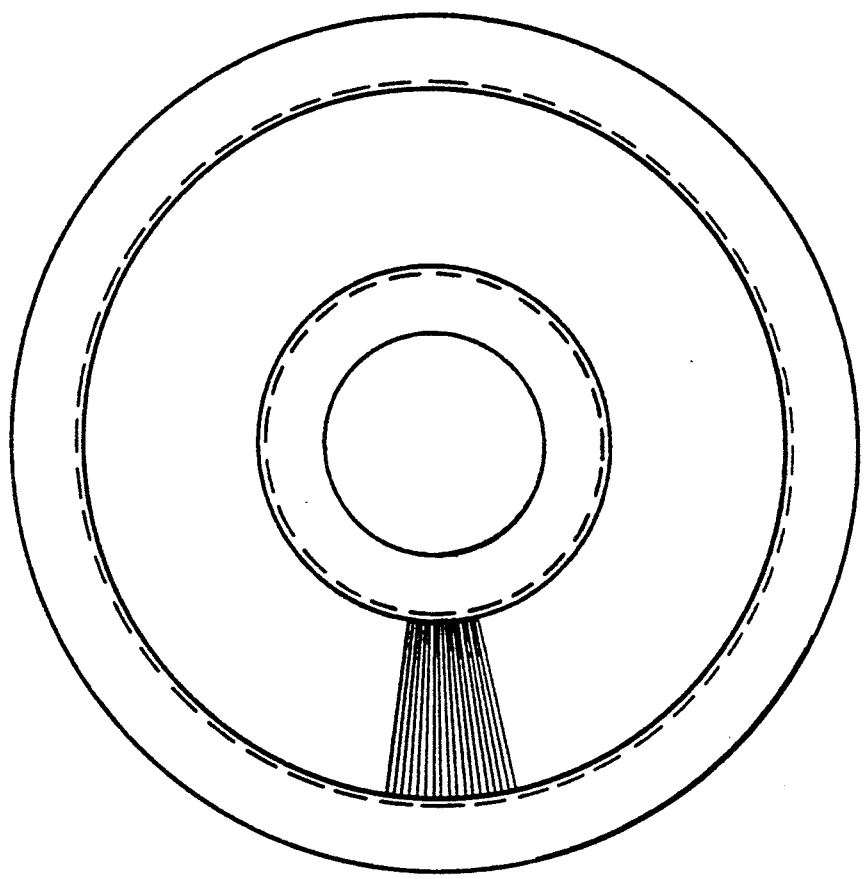
FIG. 5 is a view along the axis of rotation of the rotor of the bearing according to FIG. 1 with a face plate removed to show the sheets on edge.
Figures 6, 7:
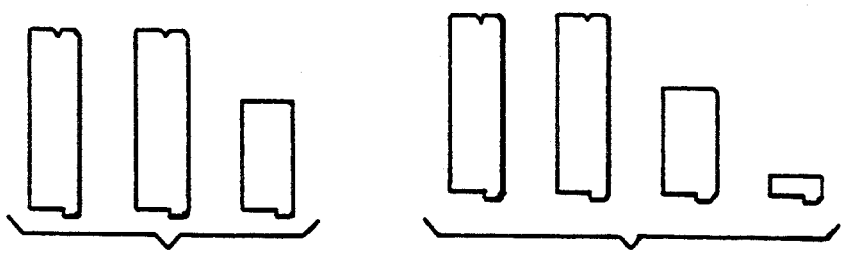
FIGS. 6 and 7 are views of the large faces of sheets in groupings as would be used in the rotor shown in FIG. 5.

Referring to FIGS. 1 and 5, the rotor 11 has a groove 16 into which the laminated assembly is stacked and held in place in much the same way as the stator sheets are stacked and held in place. The sheets are I-shaped, however. Referring to FIGS. 6 and 7, two groupings of I-shaped sheets are shown. The grouping of FIG. 6 is used six times for every time the grouping of FIG. 7 is used.

Referring again to FIG. 1, one or more position sensors 25 are placed around the outer edge of the laminated assembly on the stator. These are connected to a controller for controlling a current amplifier supplying current to the windings.

In the operation of the magnetic axial thrust bearing according to this invention, the currents in the windings are adjusted in response to deviations in the axial position of the rotor relative to the stator to thus hold the rotor at the desired axial position. Position detectors and feedback circuits for controlling the current for this purpose are known in the art.

As shown in the drawings, the grooves in the stator and rotor for holding the laminated assemblies are full circle cylindrical grooves. According to alternate embodiments, the stator and rotor may have at least one cylindrical groove therein with radial end faces.

The thrust bearing may be constructed to provide bidirectional axial forces by providing a second stator and rotor assembly identical to that shown in FIG. 1 mounted on the same shaft. The positions of the stator and rotor would be reversed along the direction of the axis of the axle. Still further, the thrust bearing may be made bidirectional by providing grooves on opposite faces of a rotor disk into which radial laminated assemblies are stacked. In this case, both stator magnets would act upon the same rotor.

Having thus defined my invention in the detail and particularity required by the Patent Laws, what is desired protected by Letters Patent is set forth in the following claims.

I claim:

1. An electromagnetic actuator for producing axial forces between a stator element and a rotor element journaled about an axis of rotation wherein, said rotor element comprises a structural base having a groove therein and a first laminated magnetic flux carrying assembly secured therein, said first laminated assembly comprising a plurality of ferromagnetic sheets stacked into said groove, each sheet extending substantially radially from and parallel to the axis of rotation, said stator element comprises a structural base having a groove therein, a second laminated magnetic flux carrying assembly and a magnetizing coil secured therein, said second laminated assembly comprising a plurality of ferromagnetic sheets stacked into said groove, each sheet extending substantially radially from and parallel to the axis of rotation, said magnetizing coil lying in a groove provided in the second laminated assembly, said rotor and stator elements being axially spaced with the first and second laminated assemblies in facing relationship, and comprising an electrical power supply for supplying an electrical current to said magnetizing coil for producing a magnetic field passing through both first and second laminated assemblies.

2. An electromagnetic actuator according to claim 1 wherein the structural base of the rotor has a full circle cylindrical groove therein and a plurality of I-shaped sheets are stacked into said groove.

3. An electromagnetic actuator according to claim 2 wherein the groove in the structural base of the rotor has at least one undercut recess therein with a plurality of I-shaped sheets stacked into said groove and recess.

4. An electromagnetic actuator according to claims 2 or 3 wherein, some sheets have a radial length equal to about a radial width of the groove and other sheets have a shorter radial length and sheets of different radial lengths are interleaved, with each sheet abutting an outer circumferential wall of the groove.

5. An electromagnetic actuator according to claim 1 wherein the structural base of the stator has a full circle cylindrical groove therein and a plurality of sheets are stacked into said groove.

6. An electromagnetic actuator according to claim 1 wherein the groove in the structural base of the stator has at least one undercut recess therein with a plurality of sheets stacked into said groove and recess.

7. An electromagnetic actuator according to claims 5 or 6 wherein some sheets have a radial length equal to about a radial width of the groove and other sheets have a shorter radial length and sheets of different radial lengths are interleaved with each sheet abutting an outer circumferential wall of the groove.

8. A rotor for an electromagnetic actuator for producing axial forces between a stator element and said rotor element journaled to rotate about an axis of rotation wherein, said rotor element comprises a structural base having a groove therein and a laminated magnetic flux carrying assembly secured therein, said laminated assembly comprising a plurality of ferromagnetic sheets stacked into said groove, each sheet extending substantially radially from and parallel to the axis of rotation.

9. A rotor according to claim 8 wherein the structural base of the rotor has a full circle cylindrical groove therein and a plurality of I-shaped sheets are stacked into said groove.

10. A rotor according to claim 8 wherein the groove in the structural base of the rotor has at least one undercut recess therein with a plurality of sheets stacked into said groove and recess.

11. A rotor according to claims 9 or 10 wherein some sheets have a radial length equal to about a radial width of the groove and other sheets have a shorter radial length and sheets of different radial lengths are interleaved with each sheet abutting an outer circumferential wall of the groove.

12. A stator for an electromagnetic actuator for producing axial forces between said stator element and a rotor element journaled about an axis of rotation wherein, said stator element comprises a structural base having a groove therein and a laminated magnetic flux carrying assembly secured therein, said laminated assembly comprising a plurality of ferromagnetic sheets stacked into said groove, each sheet extending substantially radially from and parallel to the axis of rotation and wherein some sheets have a radial length equal to about a radial width of the groove and other sheets have a shorter radial length and sheets of different radial lengths are interleaved with each sheet abutting the outer circumferential wall of the groove.

13. A stator according to claim 12 wherein the structural base of the stator has a full circle cylindrical groove therein and plurality of E-shaped sheets stacked into said groove.

14. A stator according to claim 12 wherein the structural base of the stator has a full circle cylindrical groove therein and a plurality of U-shaped sheets stacked into said groove.

15. A stator according to claim 12 wherein the groove in the structural base of the stator has at least one undercut recess therein with a plurality of sheets stacked into said groove and recess.

16. An electromagnetic thrust bearing comprising a stator element and a rotor element journaled about an axis of rotation wherein, said rotor element comprises a structural base having a groove therein and a first laminated magnetic flux carrying assembly secured therein, said first laminated assembly comprising a plurality of ferromagnetic sheets stacked into said groove, each sheet extending substantially radially from and parallel to the axis of rotation, said stator element comprises a structural base having a groove therein, a second laminated magnetic flux carrying assembly and at least one magnetizing coil secured therein, said second laminated assembly comprising a plurality of ferromagnetic sheets stacked into said groove, each sheet extending substantially radially from and parallel to the axis of rotation, said at least one magnetizing coil lying in a groove provided in the second laminated assembly, said rotor and stator elements being axially spaced with the first and second laminated assemblies in facing relationship, and further comprising, means for sensing the axial spacing between the rotor element and the stator element and generating a signal indicative thereof, an electrical power supply for supplying an electrical current to said magnetizing coil for producing a magnetic field passing through both first and second laminated assemblies, and means for adjusting the current supplied by the power supply in response to the signal indicative of the spacing between the rotor and stator.

17. An electromagnetic thrust bearing according to claim 16 wherein the structural base of the rotor has a cylindrical groove therein and a plurality of I-shaped sheets are stacked into said groove and the stator has a cylindrical groove therein and a plurality of E-shaped sheets are stacked into said groove.

18. An electromagnetic thrust bearing according to claim 16 wherein the structural base of the rotor has a cylindrical groove therein and a plurality of I-shaped sheets are stacked into said groove and the stator has a cylindrical groove therein and a plurality of U-shaped sheets are stacked into said groove.

19. An electromagnetic thrust bearing according to claim 17 or 18 wherein some of the I-shaped sheets have a radial length equal to about a radial width of the groove in the rotor and other I-shaped sheets have a shorter radial length and sheets of different radial lengths are interleaved with each sheet abutting an outer circumferential wall of the groove.

20. An electromagnetic thrust bearing according to claim 17 wherein some of the E-shaped or sheets have a radial length equal to about a radial width of the groove in the stator and other sheets have a shorter radial length and sheets of different radial lengths are interleaved with each sheet abutting an outer circumferential wall of the groove.

21. An electromagnetic thrust bearing according to claim 18 wherein some of the U-shaped sheets have a radial length equal to about a radial width of the groove in the stator and other sheets have a shorter radial length and sheets of different radial lengths are interleaved with each sheet abutting an outer circumferential wall of the groove.

* * * * *

UNITED STATES PATENT AND TRADEMARK OFFICE
CERTIFICATE OF CORRECTION

PATENT NO. : 5,153,475

DATED : October 6, 1992

INVENTOR(S) : Lloyd W. McSparran

It is certified that error appears in the above-identified patent and that said Letters Patent is hereby corrected as shown below:

On title page, item [56], References Cited, "U.S. PATENT DOCUMENTS"
   "4,983,870 9/1991 McSparran ... 310/90.5" should read
   --4,983,870 1/1991 McSparran ... 310/90.5--.

Claim 4 Line 50 Column 4 after "wherein" delete --,--.

Claim 20 Line 47 Column 6 delete "or".

Signed and Sealed this

Fifth Day of October, 1993

*Attest:*

BRUCE LEHMAN

*Attesting Officer*     *Commissioner of Patents and Trademarks*